United States Patent

Sollman

[15] 3,678,503

[45] July 18, 1972

[54] TWO PHASE ENCODER SYSTEM FOR THREE FREQUENCY MODULATION

[72] Inventor: George H. Sollman, Cambridge, Mass.

[73] Assignee: Honeywell, Inc., Minneapolis, Minn.

[22] Filed: July 6, 1970

[21] Appl. No.: 52,327

[52] U.S. Cl. ............................340/347 DD, 325/38, 178/66

[51] Int. Cl. ..........................................................H04l 3/00

[58] Field of Search.............340/347 DD, 174.1 G, 174.1 H; 178/66, 67; 325/55, 63

[56] References Cited

UNITED STATES PATENTS

| | | | |
|---|---|---|---|
| 3,422,425 | 1/1969 | Vallee | 340/347 DD |
| 3,414,894 | 12/1968 | Jacoby | 340/347 DD |
| 3,500,385 | 3/1970 | Padalino et al | 340/347 DD |

*Primary Examiner*—Maynard R. Wilbur
*Assistant Examiner*—Jeremiah Glassman
*Attorney*—Fred Jacob and Leo Stanger

[57] ABSTRACT

A multiphase encoder translates the bits of a Non-Return-to-Zero digital signal into a three frequency self-clocking signal characterized by having a data transition at the center of a binary ONE bit and a data transition between successive binary ZERO bits.

12 Claims, 3 Drawing Figures

INVENTOR
GEORGE H. SOLLMAN
BY
Faith F. Driscoll
ATTORNEY

TWO PHASE ENCODER SYSTEM FOR THREE FREQUENCY MODULATION

RELATED APPLICATIONS

"A Four Phase Encoder System for Three Frequency Modulation" invented by George H. Sollman and Samuel J. Dixon filed an even date with this application, Ser. No. 52,313 and assigned to the same assignee named herein.

"A Two Phase Encoder System for Three Frequency Modulation" invented by George H. Sollman and Samuel J. Dixon filed an even date with this application, Ser. No. 52,328 and also assigned to the same assignee named herein.

BACKGROUND OF THE INVENTION

1. Field of the Invention

This invention relates to digital encoding systems and more particularly to encoding systems for use in magnetic recording systems.

2. Discussion of Prior Art

Numerous encoding schemes have been developed for recording digital information on a magnetic medium at high densities. One such scheme involves an encoding technique which introduces few transitions in the context of the information involved.

In greater detail, the above technique never introduces any more than one transition per information bit and at least a transition once every two information bits. The rules for this encoding are:

1. a flux reversal occurs in the center of every bit cell (i.e. time interval defining a bit) containing a binary ONE and, 2. a flux reversal occurs between two adjacent bit cells containing binary ZEROS.

Because of the characteristics of the self-clocking waveform (i.e., three different time periods) which result from applying the above rules of encoding, this waveform is termed a three frequency encoded waveform herein.

Prior art encoder systems in general implement the above mentioned encoding rules with delay devices in the form of monostable multivibrators, delay lines or RC timing circuits. While delay devices may reduce the number of storage devices required in some prior art systems such devices are frequency sensitive. Hence, one disadvantage of these prior art systems is that the timing accuracy of the encoder system can vary with changes in frequency and temperature. Furthermore, the range of tolerances of these delay devices can create major problems in bit shift.

Another disadvantage of other prior art systems is that these systems use a variety of different types of storage devices and logic gates. This normally results in increases in cost, logic, and non-uniformity. Further, other prior art encoder systems combine switching devices to generate required logic functions in a manner which in some instances can give rise to certain race conditions.

OBJECTS

Accordingly, it is an object of this invention to provide an improved encoder system which generates a three frequency self-clocking waveform without the use of a frequency sensitive devices.

It is more specific object of this invention to provide an encoder system which employs a minimum number of storage devices and a multiphase clock for accurate generation of logic functions without measurable bit shift.

It is still more specific object of this invention to provide an encoder which is well suited for integrated circuit construction.

SUMMARY OF THE INVENTION

The above and other objects are provided according to the basic concept of this invention through a two phase encoder logic arrangement. This arrangement includes a two phase clock in combination with a single clocked flip-flop in series with a complementing output flip-flop.

In greater detail, the clock operates at 2N bits/sec. to synchronize it with an input bit data stream of N bits/sec. The clock in the illustrated embodiment includes a flip-flop connected to complement. The outputs of the flip-flop are thus combined with logic gates to produce two phase outputs. A first output phase clocks the bits of the data stream waveform into the encoder system. The same output phase switches the clocked flip-flop at a predetermined time in response to the input bits so as to delay each bit by one bit time.

Logic gates combine the input data stream waveform and the output of the clocked flip-flop first by gating the flip-flop output by the second of two phases to produce pulses representative a binary ONES and then by gating the bits of inverted data stream waveform and the inversion of the flip-flop output with the first of the two phases to produce pulses representative of binary ZEROS. The binary ONES and ZEROS are then gated to the output flip-flop which complements to produce the self-clocking encoded waveform.

The clocked flip-flop switches state at the trailing edge of the pulses of the first phase enabling the encoder system to generate transitions between successive binary ZEROS without giving rise to race conditions.

The above and other objects of this invention are achieved in an illustrative embodiment described hereinafter. All features which are believed to be characteristic of the invention, both as to its organization and method of operation together with further objects and advantages thereof will be better understood from the following description considered in connection with the accompanying drawings. It is to be expressly understood, however, these drawings are for the purpose of illustration and description only and are not intended as a definition of the limits of the invention.

DESCRIPTION OF THE PREFERRED EMBODIMENT

Figure 1:
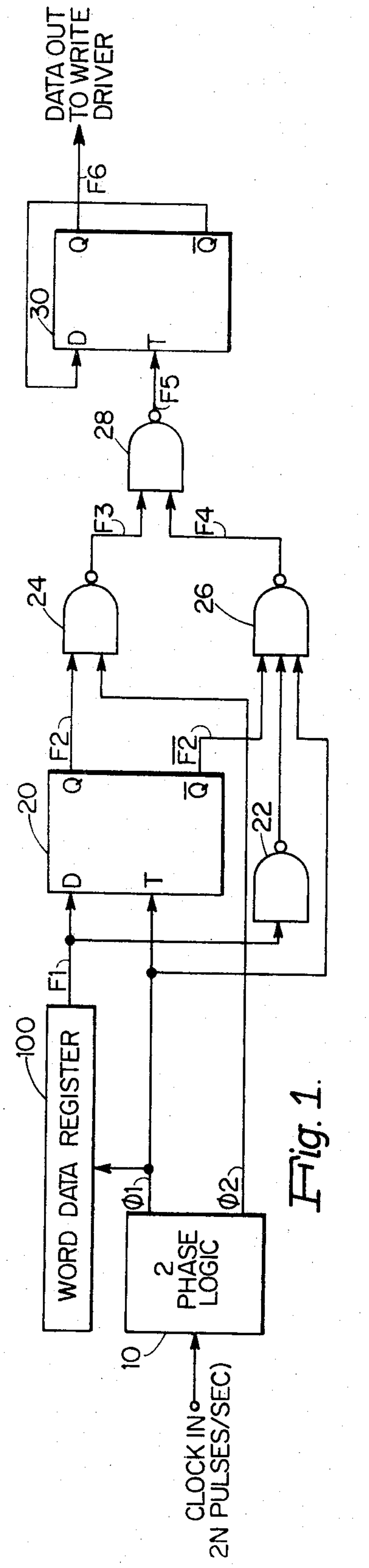
FIG. 1 shows in block diagram form the encoding system of this invention.

Referring to FIG. 1, the encoder system includes a two phase clock 10 operative to produce first and second phase outputs 01 and 02 respectively. The phase output 01 connects as a clock input to a clocked word register 100 conventional in design, which provides temporary data storage for the information bits of the data stream waveform to be encoded.

Additionally, the 01 output connects to the clock input T of flip-flop 20 to clock the information bits output, F1, connected to a data input, D, of flip-flop 20.

For the purposes of the present invention, a clocked flip-flop may be defined as one having two states, at least a single DATA input, a CLOCK input, and complementary outputs. These outputs are designated as Q and $\overline{Q}$.

An example of a clocked flip-flop is the so-called D flip-flop which is described at page 126 of the text "Logical Design of Digital Computers" by M. Phister Jr., published in 1958 by John Wiley & Sons, Inc.

It will be noted that other flip-flops such as the RST and JK can be made to operate in a similar fashion. For example, an RST flip-flop can be changed into a D flip-flop by adding a NAND gate to the SET (S) input of the RST flip-flop and then typing and NAND gate input to the R input. Similarly, an equivalent change can be made to a JK flip-flop which converts it into a D flip-flop.

The logic state presented to the data input D appears at the Q output after the occurrence of the clocking transition one bit interval later. In the arrangement shown, flip-flop 20 switches on the trailing edge, i.e. the negative going edge, of the 01 pulses and produces an output F2.

The data stream waveform is fed to a gate 22 which in the illustrated embodiment is symbolically shown as a NAND gate. As welliknown in the art, the NAND gate produces an inverted AND function. Here, it has a single input and functions as an inverter. It will be noted that both inputs of the NAND gate may be connected together, or the unused input tied to a voltage representative of a binary ONE.

The assertion output Q of flip-flop 20 is fed to a NAND gate 24 which also receives 02 pulses. The NAND gate produces as an output F3 inaccordance with the Boolean expression:

(1) $F3=\overline{F2\cdot 02}$.

Figures 1A, 2:
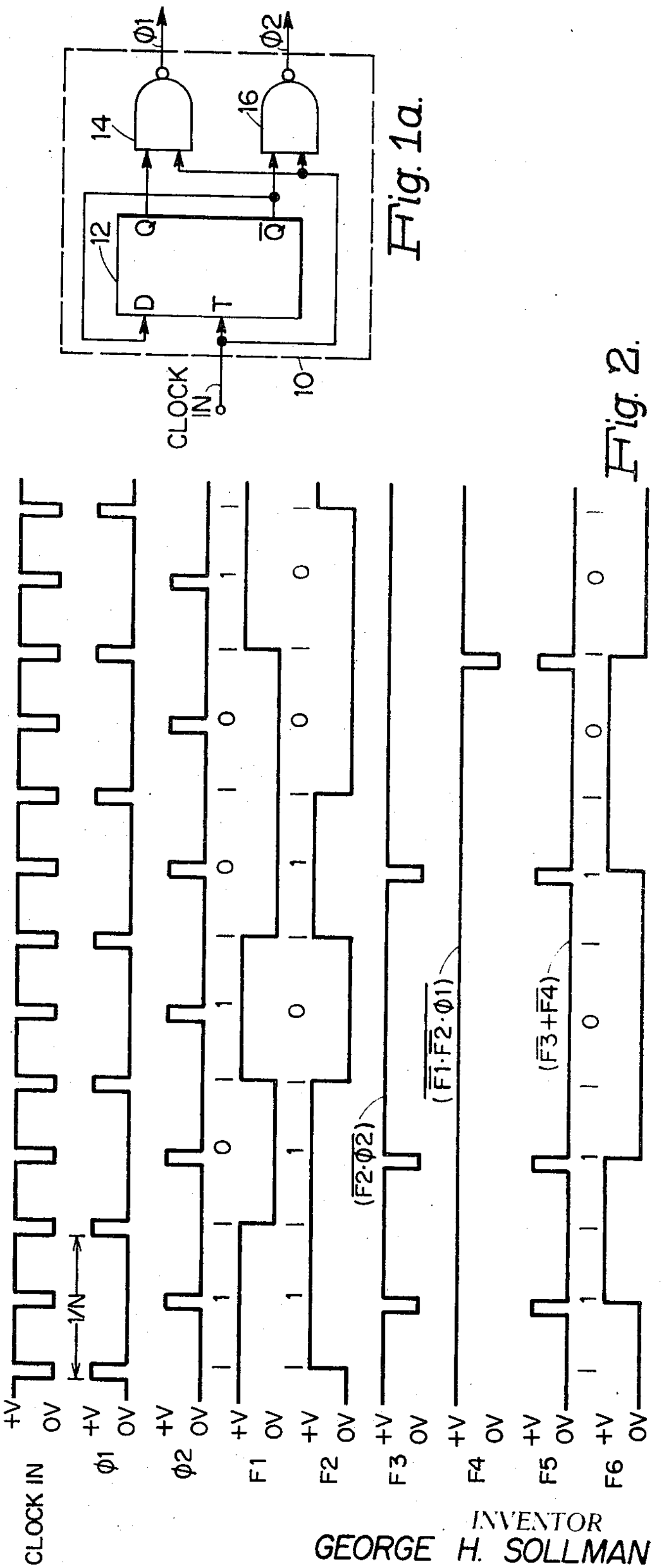
FIG. 1*a* shows in greater detail, a preferred embodiment of the two phase clock of FIG. 1; and, FIG. 2 is a timing diagram showing a series of waveforms illustrating the relationship of signals in different portions of the encoder system of FIG. 1.

It will be appreciated that this expression as others herein assume that a binary ONE is defined as a high or positive level and a logic ZERO is defined as ground or as a low-voltage level. The foregoing is illustrated by the waveforms of FIG. 2.

The output of NAND gate 22 feeds a further NAND gate 26 which also receives the delayed inversion of the input data stream waveform designated as F2 in addition to the data stream waveform F1 and 01 output. The NAND gate 26 produces an output F4 inaccordance with the Boolean expression:

(2) $=\overline{F1}\cdot\overline{F2}\cdot 01$

A further NAND gate 28 feeds the outputs F3 and F4 to a further complementing flip-flop 30. This flip-flop, as shown, may be a D flip-flop connected to complement. The self-clocking three frequency output, F6, is then fed to a driver circuit (not shown)

FIG. *1a* shows a preferred embodiment of the two phase clock 10. The clock 10 includes a single complementing flip-flop 12 whose outputs Q and $\overline{Q}$ feed NAND gates 14 and 16 respectively. These gates as the flip-flop 12 are conditioned by pulses applied by a generator (not shown) to a clock IN line to produce 01 and 02 pulses having a 180° out-of-phase relationship to each other as shown in FIG. 2. While any type of generator may be used, depending upon the accuracy required in a given system, a crystal oscillator may be preferred since such oscillators are relatively inexpensive and extremely accurate.

DESCRIPTION OF OPERATION

With reference to FIGS. 1 and 2, the operation of the encoder system of FIG. 1 will now be described. Now, as shown in FIG. 2, the data stream waveform, F1, is shifted out of the data register 100 by applying 01 pulses thereto and the waveform, F1, then is applied to flip-flop 20.

This non-return to zero (NRZ) waveform is coded to represent the binary information 1010011. As shown in FIG. 2, the pulses of the 01 pulse train are such that the trailing edges (i.e. negative going transitions) occur at the boundaries or bit intervals of the information bits while trailing edges of the 02 pulse train occur at the centers of the information bit cells.

The 01 pulses applied to the clock input, T, of flip-flop 20 condition it to delay each of the information bits by a bit interval as shown by waveform F2, of FIG. 2. When the NRZ waveform has a binary ONE bit, NAND gate 24 is enabled by the F2 output of flip-flop 20 to pass 02 pulses to the clock input T of complementing flip-flop 30 via NAND gate 28. This is illustrated by waveform F3 of FIG. 2.

When NRZ waveform has two successive binary ZERO bits, NAND gate 26 is enabled by the $\overline{F2}$ output of flip-flop 20 and inversion of waveform F1 to pass 01 pulses through NAND gate 28 to the clock input T of flip-flop 30 as illustrated by waveform F4. It will be noted that flip-flop 20 is set at the trailing edge of the 01 pulses. Hence, the output waveform F4 is generated without race conditions.

The NAND gate 28, as illustrated by waveform F5, conditions flip-flop 30 to change state or complement by applying the pulse outputs of NAND gates 24 and 26 in turn producing the self-clocking three frequency signal corresponding to waveform F6. Flip-flop 30 as illustrated by waveform F6 switches state at the trailing edge of the pulses supplied by gates 24 and 26. However, it can also be adapted to switch state on the leading edge (i.e. positive going transition) of each pulse as well.

The "ONE" transition occurs at the centers of the bit intervals for each ONE bit in the input waveform F1. And, the "-ZERO" transitions only occur the boundary between two successive binary ZEROS in the input waveform F1. Hence, the output waveform is coded so that a transition at the center of a bit time represents a binary ONE and the absence of a transition at the center represents a binary ZERO. As mentioned previously, the waveform F6 is well suited for recording digital information on a magnetic medium at high densities.

An improved two phase encoder system which utilizes a minimum number of flip-flops and gates has been disclosed. Since in the illustrated embodiment the same type of gates and flip-flops can be used, the encoder system is easily implemented at low cost using integrated circuits. For example, each of the flip-flops and gates may be implemented using MOS logic such as described in an article entitled "MOS Complex Array System Design" by L.L. Boysel and G. P Carter appearing in the February 1969 issue of a publication titled "Electro-Technology." Furthermore, because each of the encoders the flip-flops are clocked by multi-phase signals, system can accurately generate the requisite waveforms notwithstanding changes in environment.

It will be appreciated that changes can be made to the illustrated embodiment without departing from the invention. For example, equivalent gates can be used in place of NAND gates. Further, equivalent types of flip-flops may be also substituted for D flip-flops as mentioned previously. For this purpose, the text by Phister may be consulted.

While in accordance with the provisions and statutes, there has been illustrated and described the best form of the invention known, certain changes may be made in the circuits described without departing from the spirit of the invention as set forth in the appended claims and that in some cases, certain features of the invention may be used to advantage without a corresponding use of other features.

Having described the invention, what is claimed as new and novel for which it is desired to secure Letters Patent is:

1. An improved encoder for translating an input NRZ data waveform into a self-clocking three frequency waveform using a first phase signal having pulses which occur only at the boundaries of the bit intervals of said NRZ data waveform and a second phase signal having pulses which occur only within said bit intervals, said encoder comprising:

a clocked bistable storage device, including a CLOCK input for receiving pulses of said first phase signal and a DATA input for receiving said input NRZ waveform, said storage device being conditioned by said pulses of said first phase signal to produce a data signal waveform and the complement of said data signal waveform, each being delayed by one bit interval to said input NRZ waveform;

a first gate connected to receive said data signal waveform and pulses of said second phase signal, said first gate being operative to pass a pulse of said second phase signal when said data signal waveform is in a state representing that a binary ONE occurred within a bit interval of said input NRZ waveform;

a second gate connected to receive the complement of said data signal waveform, the complement of said input NRZ waveform and said first phase signal, said second gate being operative to pass a pulse of said first phase signal when said waveforms are in the same states representing that said input NRZ waveform includes two successive binary ZEROS; and, a complementing bistable output device connected to said first and second gates and being conditioned to switch state to produce said self-clocking waveform in which transitions occur when there are ONES and between the boundaries between successive ZEROS.

2. The encoder of claim 1 wherein said storage devices are D type flip-flops and said gates are NAND gates.

3. An encoder for translating bits of data stream waveform generated at a rate of N bits/sec. into a three frequency self-clocking waveform characterized as having bit intervals comprising:

a two phase clock for generating first and second phases of pulses from an input clock waveform of 2N pulses/sec. to have a predetermined phase relationship to said information bits wherein the pulses of said first phase occur at the boundaries between said bits and the pulses of said second phase occur within said bits;

a clocked two state storage device including a CLOCK input for receiving pulses of said first phase and a DATA input for receiving said data stream waveform, said storage device connected to be switched at the trailing edge of each of said pulses of said first phase between its two states in accordance with said data stream waveform applied to said DATA input to provide a data signal and the complement of said data signal, each delayed by one bit interval from said data stream waveform;

a first gate including means for receiving said data signal and pulses of said second phase, said gate being adapted to pass a pulse of said second phase when said data stream waveform is in a state representative of a binary ONE;

a second gate including means for receiving said pulses of said first phase, the complement of said data signal and the complement of said input data stream waveform, said second gate being conditioned to pass a pulse of said first phase when said data stream waveform is in a binary zero state for more than two successive pulses of said first phase as defined by the complements of both said data signal and said data stream waveform being in the same state;

a third gate coupled to said first and second gates; and, a complementing two state storage device coupled to said third gate and being conditioned by pulses of said first and said secOnd phase to generate said three frequency self-clocking waveform coded so as to have transitions corresponding to a binary ONE at the center of said bit intervals and transitions at the boundaries of said bit intervals between two successive binary ZEROS.

4. The encoder of claim 3 wherein all of said gates are NAND gates.

5. The encoder of claim 3 wherein said clocked storage device and said complementing storage device are D type flip-flops.

6. The encoder of claim 3 further including a data shift register connected to receive said pulses of said first phase and being conditioned thereby to apply the bits of said data stream waveform to said DATA input of said clocked flip-flop so as to establish said predetermined phase relationship between said bits and the pulses of said first and second phases.

7. The encoder of claim 3 wherein said two phase clock includes a complementing bistable storage device connected to receive said input clock waveform and for generating a pair of complementary outputs;

first and second gates, each being coupled to receive said input clock waveform and a different one of said complementary outputs, said first and second gates being conditioned thereby to generate pulses of said first and second phase signals respectively.

8. The encoder of claim 7 wherein said bistable device is a D type flip-flop and said gates are NAND gates.

9. An improved encoder for translating bits of a data stream waveform F1 having a rate of N bits/sec. into a self-clocking waveform comprising:

a two phase clock generator for generating pulses of first and second phases 01 and 02 in response to a clock input signal of a rate of 2N pulses/sec. so as to have the 01 pulses coincide with the boundaries of said bits and the 02 pulses coincide with the centers of said bits;

a clocked bistable device, including a CLOCK input for receiving said 01 pulses and a DATA input for receiving said data waveform F1, said bistable device being conditioned by said waveform F1 to be switched at the trailing edge of said $\underline{01}$ pulses to produce a waveform F2 and its complement $\overline{F2}$, each being delayed by a bit interval to said waveform F1;

a first gate for receiving said waveform F2 and said 02 pulses, said gate being enabled to produce an output F3 in accordance with the expression $F3=\overline{F2\cdot 02}$;

a second gate for receiving the complement of said waveform, F2, the complement said waveform F1 and said 02 pulses, said gate being enabled to produce an output F4 in accordance with the expression $F4=\overline{\overline{F1}\cdot\overline{F2}\cdot 01}$; and, a complementing output bistable device including a gate connected to said first and second gates for applying a complementing input F5 thereto in accordance with the expression $F5=\overline{F3}+\overline{F4}$, said bistable device being conditioned thereby to switch state during a bit interval when there is a ONE and between bit intervals when there are two successive ZEROS in said data stream waveform.

10. The encoder of claim 9 wherein said storage devices are D type flip-flops and said gates are NAND gates.

11. The encoder of claim 9 further including a data shift register connected to receive said 01 pulses and being conditioned thereby to apply the bits of said data waveform to said DATA input so as to establish said coincidence between said boundaries and centers of said bits and said 01 and 02 pulses.

12. The encoder of claim 9 wherein said two phase clock generator includes a complementing bistable storage device connected to generate a pair of complementing outputs from said clock input signal and first and second gates connected to receive said clock input signal and a different one of said complementary outputs, said first and second gates being conditioned thereby to generate said 01 and 02 pulses respectively at a rate of N pulses/sec. and 180° out-of-phase with one another.

* * * * *

UNITED STATES PATENT OFFICE
CERTIFICATE OF CORRECTION

Patent No. 3,678,503 Dated July 18, 1972

Inventor(s) George H. Sollman

It is certified that error appears in the above-identified patent and that said Letters Patent are hereby corrected as shown below:

Column 5, line 37, "sec0nd" should read -- second -- . Column 6, lines 13, 45 and 52, "01 and 02" should read -- Ø1 and Ø2 -- ; lines 14, 18, 21, 30 and 42, "01" should read -- Ø1 -- ; lines 15, 24, 26 and 29, "02" should read -- Ø2 -- ; line 35, "~~F5=F3 + F4~~" should read -- F5=F3 + F4 -- .

Signed and sealed this 20th day of March 1973.

(SEAL)
Attest:

EDWARD M.FLETCHER,JR.
Attesting Officer

ROBERT GOTTSCHALK
Commissioner of Patents

FORM PO-1050 (10-69)
USCOMM-DC 60376-P69
☆ U S GOVERNMENT PRINTING OFFICE : 1969 O—366-334